Oct. 25, 1960 B. E. CURRAN 2,957,629
PRESSURE AND TEMPERATURE CONTROL OF AIR MIXING OUTLET UNIT
Filed Aug. 14, 1958 5 Sheets-Sheet 4

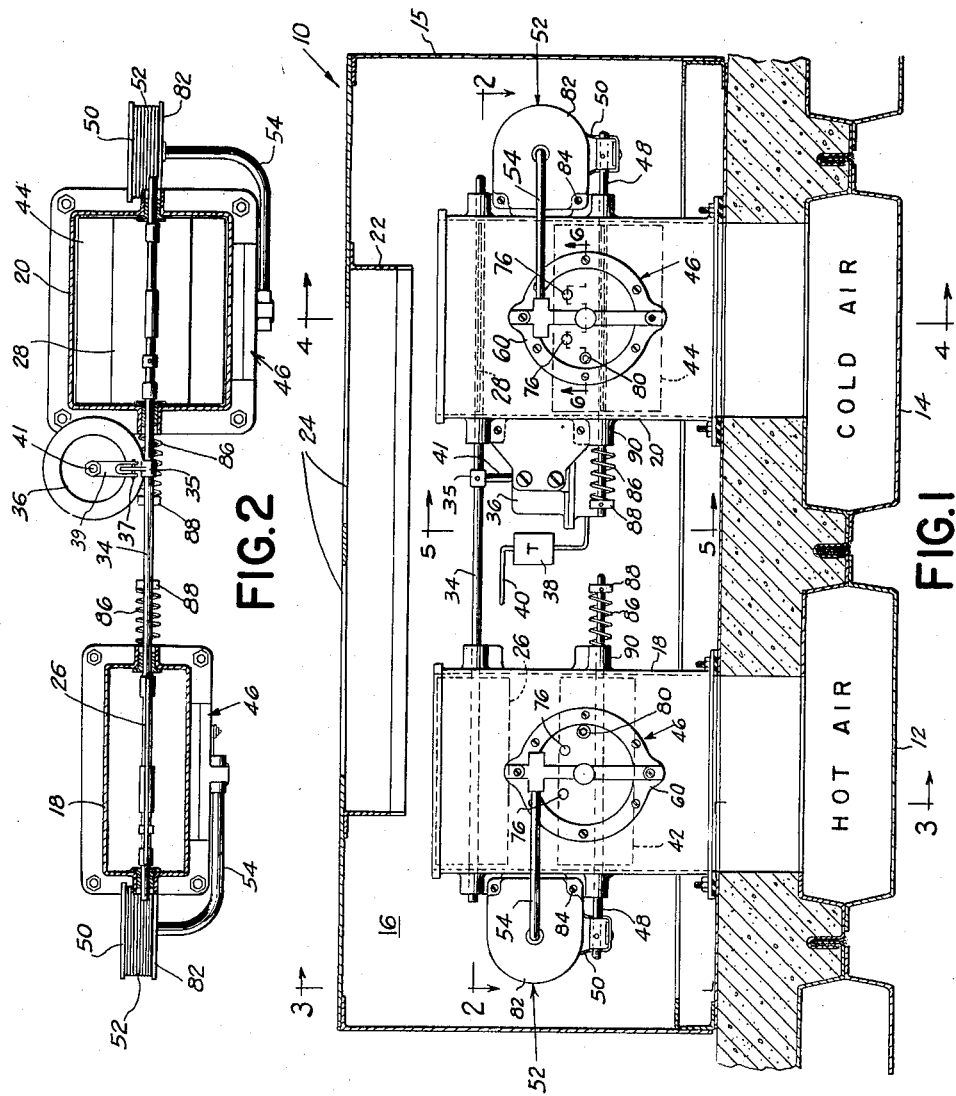

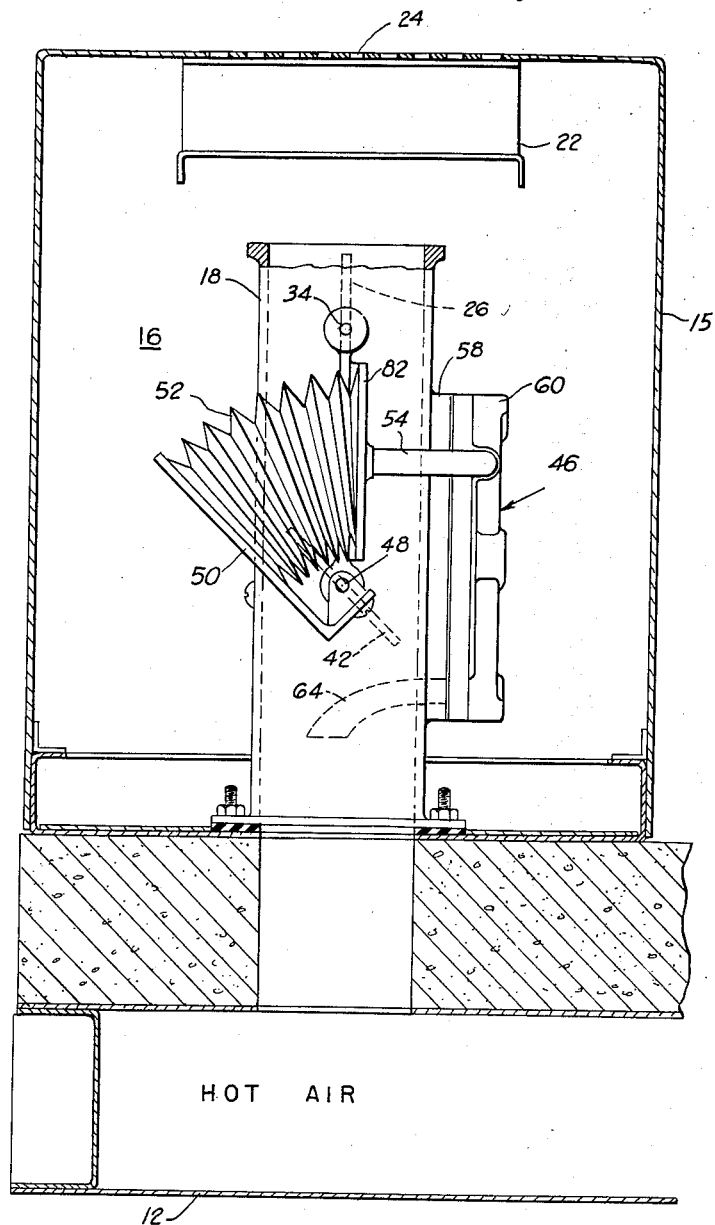

INVENTOR.
Bernard E. Curran

BY Robert R. Churchill

ATTORNEY

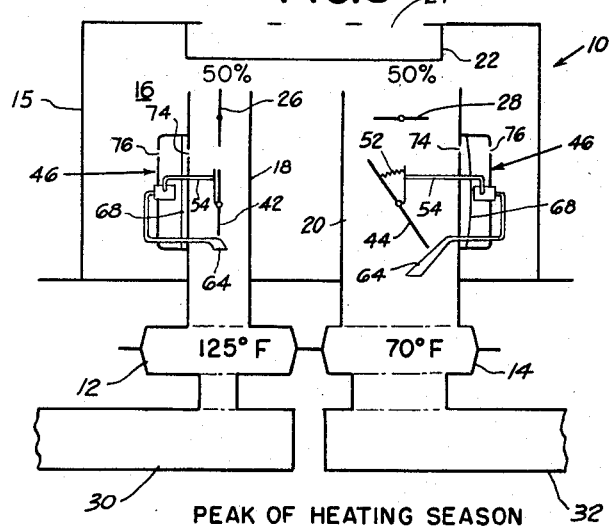
FIG. 8 — PEAK OF HEATING SEASON
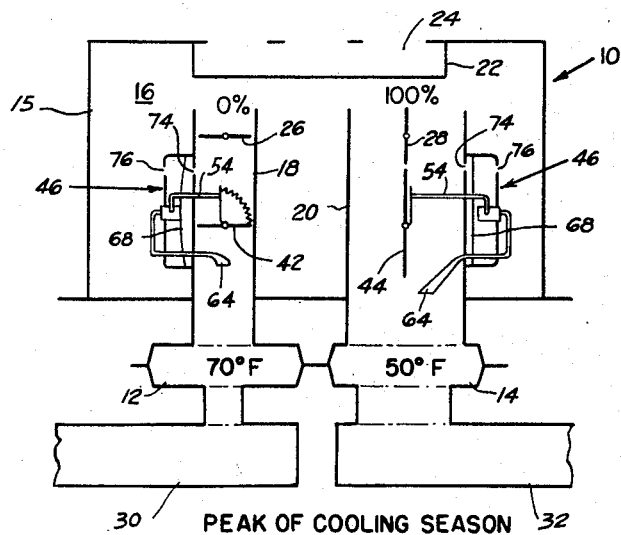
FIG. 9 — PEAK OF COOLING SEASON

United States Patent Office 2,957,629
Patented Oct. 25, 1960

2,957,629

PRESSURE AND TEMPERATURE CONTROL OF AIR MIXING OUTLET UNIT

Bernard E. Curran, Sewickley, Pa., assignor to H. H. Robertson Company, Pittsburgh, Pa., a corporation of Pennsylvania Filed Aug. 14, 1958, Ser. No. 755,047

9 Claims. (Cl. 236—13)

This invention relates to an air discharge outlet unit for use in an air conditioning and distributing system.

The invention has for an object to provide a novel and improved air discharge outlet unit of the character specified having novel provision for controlling the discharge of conditioned air in a manner such as to maintain a constant discharge volume of conditioned air during both the winter heating and summer cooling seasons.

With this general object in view and such others as may hereinafter appear, the invention consists in the air discharge outlet unit and in the various structures, arrangements and combinations of parts hereinafter described and particularly defined in the claims at the end of this specification.

In the drawings illustrating the preferred embodiment of the invention:

Fig. 1 is a front elevation partly in cross section of an air discharge outlet unit embodying the present invention;

Fig. 2 is a cross sectional plan view of a portion of the outlet unit as taken on the line 2—2 of Fig. 1;

Fig. 3 is a vertical cross section taken on the line 3—3 of Fig. 1;

Fig. 8 is a diagrammatic view illustrating the positions assumed by the control dampers during the peak of the heating season; and Fig. 9 is a similar view showing the positions assumed by the control dampers during the peak of the cooling season.

Figure 4:
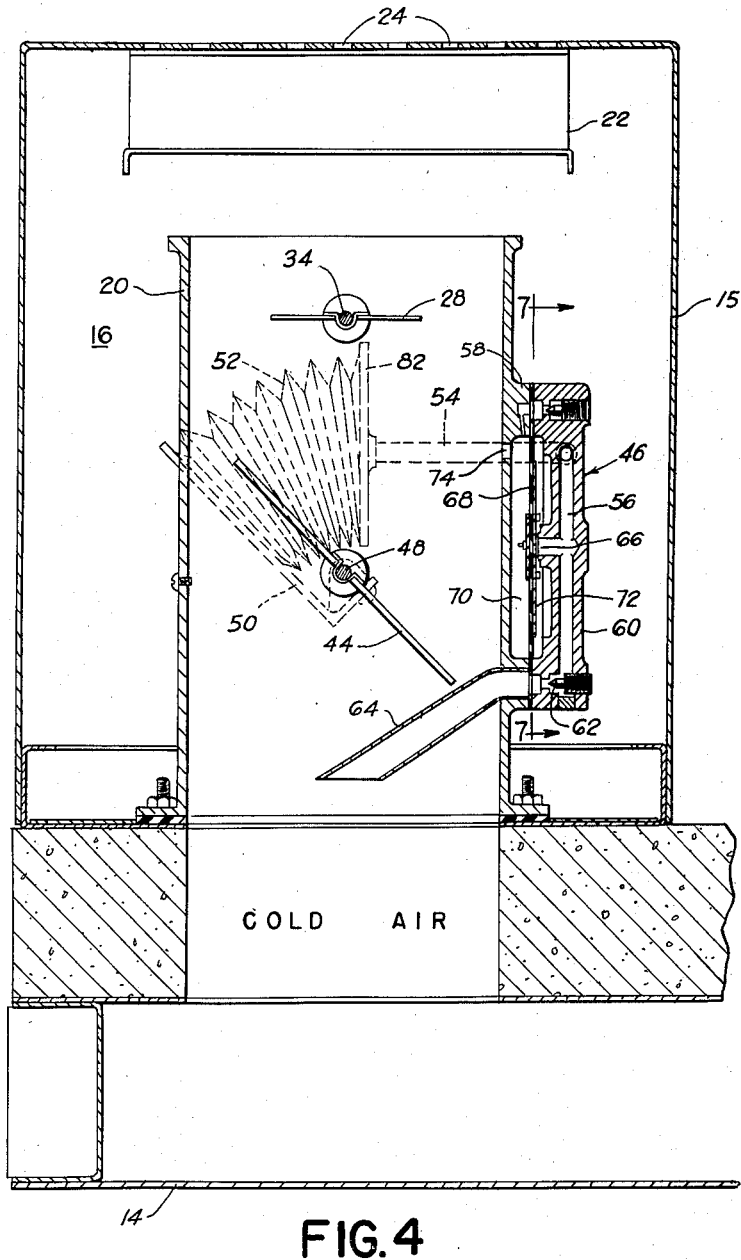
Fig. 4 is a vertical cross section taken on the line 4—4 of Fig. 1.

In general the present invention contemplates a novel air discharge outlet unit for a multiple duct air conditioning system whose construction enables superior and more accurate control to be maintained of the flow of air whereby to provide a constant volume of air flow and a stable, uniform discharge from the outlet unit during both the winter heating season and the summer cooling season. In a copending application of Bernard E. Curran, et al., Serial No. 649,355, filed March 29, 1957, having the same assignee as the instant application, the air discharge outlet unit therein shown is supplied with air of different condition through each of a pair of stacks connected to air supply ducts. The differently conditioned air under substantial pressure and at high velocity is caused to flow through said stacks into the outlet unit, the differently conditioned air being mixed in the outlet unit and discharged into the room, and the volume as well as the proportions of the differently conditioned air in each stack may be varied by operation of volume control or outlet dampers under the control of a thermostat in the room. Pneumatically operated pressure regulating dampers are also provided in the outlet unit disclosed in said copending application for maintaining a constant static pressure of air supplied through each stack irrespective of variations in pressure of the air in the supply ducts and also irrespective of the variations in the proportions of the differently conditioned air delivered by each stack in accordance with the movement of the volume control or outlet dampers in response to the room thermostat.

The thermostatically operated volume control or outlet dampers shown in the copending application, Serial No. 649,355 are arranged at right angles to each other for operation during the heating season and are connected to operate simultaneously to effect opening of one damper while the other damper is closing so that during the heating season the discharge from the hot air stack and from the cold air stack may be modulated against each other, thus producing a constant-volume, variable-temperature type of outlet unit. During the cooling season both stacks are supplied with cold air, and the position of the dampers is changed from a position at right angles to each other to a position wherein the dampers are aligned and open and close together so as to vary in equal amounts the volume of cold air delivered from each stack, thus producing a constant-temperature, variable-volume type of outlet unit.

In accordance with the present invention the air discharge outlet unit is novelly constructed to provide a constant volume or uniform rate of air flow during both the winter heating season and the summer cooling season and to eliminate any need for seasonal changeover of the position of the volume control dampers relative to each other. In the illustrated embodiment of the invention this is accomplished by increasing the size of one of the stacks, herein shown as the cold air stack, to about twice the size of the other stack to double the capacity thereof and by a novel arrangement of the volume control and pressure regulating dampers as will be hereinafter described.

Referring now to the drawings, the air discharge outlet unit and control assembly indicated generally at 10 is herein shown as designed to be used with a multiple duct air conditioning and distributing system of the type shown in the patent to Richard P. Goemann, No. 2,729,429, issued January 3, 1956, wherein differently conditioned air, such as hot air and cold air or tempered air, may be conducted through cells 12, 14 respectively forming components of a load supporting floor. The illustrated outlet unit includes an outer casing 15 defining a mixing chamber 16 into which hot air and cold or tempered air respectively may be delivered from the cells 12, 14 through stacks 18, 20 enclosed by the casing 15 and connected to openings in the upper walls of the air cells 12, 14 respectively. The air delivered to the mixing chamber 16 passes through a baffle or sound trap member 22 of any usual or preferred type and is discharged through outlet grille openings 24 provided in the top wall of the casing 15. One of the stacks, herein shown as comprising the cold air stack 20, is preferably of a size equal to twice the cross sectional area of the hot air stack 18 as illustrated in Fig. 2. Each stack is provided adjacent its upper end with a volume control or outlet damper 26, 28 respectively, the damper 26 having an area such as to substantially fill the cross sectional area of its stack 18 when the damper is closed, and the damper 28 having an area such as to fill or close off substantially one-half of the cross sectional area of the double size stack 20 when it is in its fully closed position. As diagrammatically illustrated in Figs. 8 and 9, the air conducting cell 12 may be connected to the source of hot air by a header duct 30, and the air conducting cell 14 may be connected to the source of tempered air or cold air by a header duct 32. In practice, because of the extra capacity of the double size stack 20, alternate stacks 20 of successive outlet units may be mounted on the same supply cell 14, intermediate stacks being mounted on an adjacent cold air cell so as to avoid overloading a single supply cell.

The volume control or outlet dampers 26, 28, as shown in Fig. 1, are mounted on a shaft 34 extending through both stacks 18, 20, and the dampers are arranged at right angles to each other so that upon rotation of the shaft 34 in one direction one damper will move in a closing direction and the other damper in an opening direction, and conversely, rotation of the shaft 34 in the opposite direction will effect closing of the open damper and opening of the closed damper. The volume control or outlet dampers 26, 28 are automatically adjusted between their open and closed positions pneumatically by an air motor 36 actuated by a room thermostat diagrammatically indicated at 38 which acts as a valve between a compressed air line 40 and the motor to increase or decrease the air pressure to the motor in accordance with the room temperature.

Figure 5:
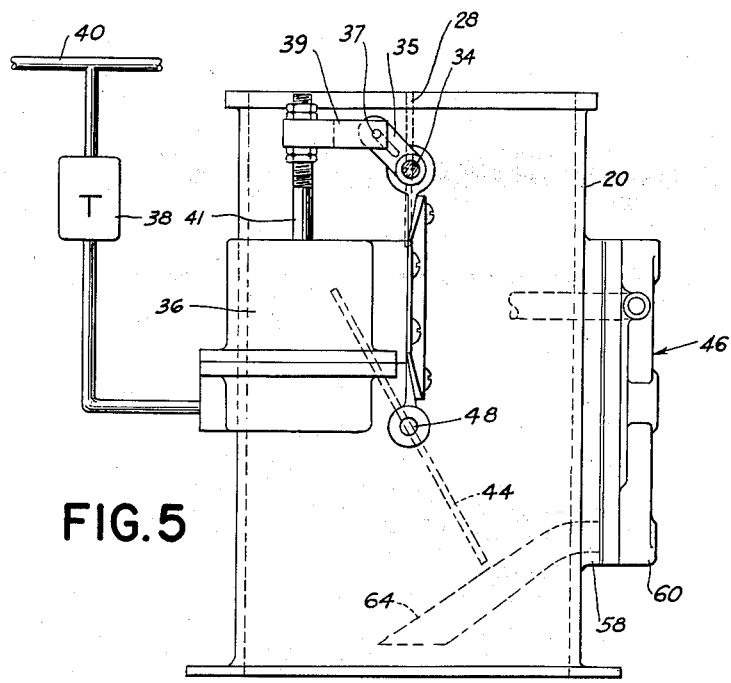
Fig. 5 is a side elevation of a control unit as seen from the line 5—5 of Fig. 1.

As shown in Fig. 5, the shaft 34 is provided with a slotted arm 35 fast thereon arranged to cooperate with a pin 37 carried by an arm 39 secured to and extended laterally from the piston stem 41 of the motor 36. In operation when the temperature in the room increases above a predetermined temperature the thermostat increases the pressure to the motor 36 causing the stem 41 to project upwardly. Thus, as shown in Fig. 5, the cold air damper 28, normally closed during the winter heating season, has been moved from its closed position to an open position to provide a maximum amount of cold air to reduce the room temperature. At the same time, the hot air damper 26, normally open during the winter heating season, is moved from its open position to a closed position. Conversely, when the temperature in the room drops below a preselected temperature, the thermostat decreases the pressure to the motor 36 causing the stem 41 to retract whereby to reverse the direction of movement of the dampers to thereby supply more hot air and less cold air to the room. The hot air damper 26 is shown in its open position in Fig. 3, and in Fig. 4 the cold air damper 28 at right angles thereto is shown in its closed position, indicating that the thermostat is calling for maximum heat.

Figure 6:
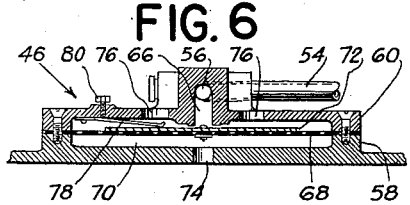
Fig. 6 is a cross sectional detail view of pneumatic control mechanism taken on the line 6—6 of Fig. 1.
Figure 7:
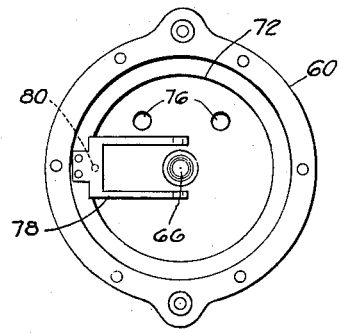
Fig. 7 is a detail view of a portion of the pneumatic control mechanism as seen from the line 7—7 of Fig. 4.

Each air conducting stack 18, 20 is also provided with a pressure reduction damper 42, 44 disposed below or on the upstream side of the volume control or outlet dampers 26, 28 respectively for substantially restoring the static pressure in the portions of the stacks between the upper and lower dampers to a predetermined value when variations in the pressure between the dampers in the stacks occur upon operation of the volume control dampers or upon variations in air supply pressure. It will be observed that each pressure reduction damper 42, 44 is of an area such as to substantially fill the cross sectional area of its respective stack, the area of the damper 44 being substantially twice the area of the damper 42 as illustrated in Fig. 2. Each pressure reduction damper is controlled by an individual, pneumatically operated static pressure regulator, indicated generally at 46, of the type disclosed in the copending application referred to. As herein illustrated, each pressure reduction damper is mounted on a shaft 48 which is connected by a rigid arm 50 to the movable end of a bellows 52. The stationary end 82 of the bellows 52 is connected by an air tube 54 to a changer 56 formed in the regulator unit 46. As herein shown, each regulator unit includes a base portion 58 formed integrally with the side of its stack and a cover plate 60 secured to the base portion 58. The air tube 54 communicates with the upper end of the chamber 56, the lower end of the chamber being connected through an adjustable needle valve 62 and pickup tube 64 extending into the stack in the path of the main air supply in the stack on the upstream side of its pressure reduction damper 42, 44. The chamber 56 is also provided with an opening comprising a bleeder port 66 arranged to cooperate with a flexible diaphragm 68. As shown in Fig. 4, adjacent faces of the base portion 58 and cover plate 60 are recessed to provide a second chamber 70 across which the flexible diaphragm 68 extends, the diaphragm being provided with a metal contact plate 72 on one side thereof for cooperation with the bleeder port opening 66. One side of the chamber 70, separated by the diaphragm, is provided with a static pressure sensing opening 74 in communication with the air supply in the stack at a point between each mixing damper 26, 28 and its pressure reduction damper 42, 44 respectively. The other side of the chamber 70 is open to the mixing chamber 16 through openings 76 formed in the cover plate 60 as shown in Fig. 1. As illustrated in Figs. 6 and 7, the contact plate 72 of the diaphragm is normally resiliently maintained in a position spaced from the bleed port 66 by a leaf spring member 78 secured to the inner face of the cover plate 60 and having two legs spaced apart and engaging the contact plate to urge it away from the bleed port. The effective pressure of the leaf spring 78 may be adjusted by a set screw 80 mounted in the cover plate 60 which engages an intermediate portion of the leaf spring as shown. Normally, when a volume control or outlet damper 26 or 28 is in an open position the pressure of the air from the main air supply passing into the pickup tube 64 and chamber 56 is not sufficient to inflate the bellows 52, and any air passing into the tube is permitted to escape through the bleeder port 66 and openings 76. Likewise, the pressure between a volume control damper 26, 28 and its pressure reduction damper 42, 44 when a volume control damper is in an open position is not sufficient to overcome the spring and expand the diaphragm 68 so that the contact plate 72 will remain in its spaced position to permit escape of air through the bleed port 66. However, when a volume control or outlet damper is moved in a closing direction the air pressure in the stack between the two dampers increases causing the diaphragm to expand and to move the contact plate 72 in a direction to close the bleed port 66. As a result of the closing of the bleed port, the air pressure in the chamber 56 is built up and the bellows 52 is inflated which effects a rocking of the pressure reduction damper in a closing direction. The flow of air past the pressure reduction damper is reduced and, consequently, the pressure between the outlet and pressure reduction dampers is reduced. In this manner a constant pressure and stable flow of air into the mixing chamber 16 and discharge through the outlet grille openings 24 is maintained.

On the other hand, in the event that the main air supply pressure should vary such as to increase the flow of air into the pick-up tube 64 the air pressure in chamber 56 will also be increased to effect inflation of the bellows and rocking of the pressure reduction damper in a closing direction to reduce the pressure, thus also tending to maintain a constant static pressure between the two dampers. The needle valve 62 may be adjusted to regulate the admission of air so that the bleed port 66 can normally exhaust more air than is admitted whereby to permit deflation of the bellows and opening of the pressure reduction damper as described.

As herein shown, the bellows 52 may comprise a pleated structure of relatively thin flexible material connected at one end to the fixed end plate 82 which may be supported from the stack by lugs 84 as shown in Fig. 1. The end plate 82 is provided with an opening therein for receiving the pipe 54 connecting the chamber 56 with the interior of the bellows. The other end of the flexible bellows 52 is connected to the movable arm 50 which is fixed to the damper shaft 48 to effect rotation thereof upon expansion and contraction of the bellows. A coil spring 86 normally holds the bellows in a collapsed position. It will be understood that the operating pressure of the air entering the pickup tube 64 is a measure of the total pressure of the air entering the stack from the main supply ducts. In operation when the bellows 52 is fully inflated the pressure reduction damper is fully closed, and when the bellows 52 is fully collapsed the pressure reduction damper is fully open. In order to effect return of the bellows from an inflated position to a deflated position, upon a reduction of the pressure in the chamber 56 the coil spring 86 is wound about the damper shaft 48, one end of the spring being fixed in a knurled collar 88 adjustably mounted on the shaft, the other end of the spring being fixed in the bearing hub 90 as shown. Provision is also made for determining the static pressure within the stack between the outlet and pressure reduction dampers. As illustrated in Fig. 4, a removable connection in the form of a needle valve 61 is provided in cover plate 60. Valve 61 normally closes openings 63, 65 which communicate with the interior of the stack through sensing opening 74 and may be removed and a suitable gauge for indicating the pressure attached in its place.

For convenience of description the air supply ducts and stacks have been referred to as "hot air ducts," "cold air ducts" and "tempered air ducts" in the description thus far. However, it will be understood that these terms are intended to mean differently conditioned air of any temperatures desired to be mixed and discharged into the room, hot and tempered air being preferably supplied for the winter heating season, and cold and tempered air being preferably supplied during the summer cooling season.

Referring now to Figs. 8 and 9 diagrammatically illustrating the positions of the dampers during the peak of the heating season and during the peak of the cooling season respectively, it will be seen that during the heating season it is preferred to supply hot air at a temperature of about 125° F. to the stack 18 and to supply tempered air at a temperature of about 70° F., or slightly lower than the normal room temperature desired, to the stack 20, as indicated in Fig. 8, and that during the cooling season the stack 18 will be supplied with tempered air at about 70° F., and as indicated in Fig. 9, the stack 20 will be provided with cold air at a temperature of about 50° F.

In the operation of the air discharge outlet unit during the peak of the heating season when the thermostat is calling for maximum heat the volume control or outlet damper 26 will be wide open to supply a maximum amount of hot air, and the volume control or outlet damper 28 will be closed as shown in Fig. 8. However, since the damper 28 covers only one-half of the cross sectional area of the double sized stack 20 the latter will still deliver to the chamber 16 tempered air past the closed damper at one-half of its full capacity. The individual static pressure regulators will cause their respective dampers 42, 44 to assume appropriate positions in response to variations from a predetermined stack pressure to maintain a constant static pressure within the stacks. Thus, at the peak of the heating season, as shown in Fig. 8, the hot air stack 18 will supply 50% of the air, and the tempered air stack 20 will provide the other 50% of the air to make up the total volume of air delivered to the mixing chamber 16. Thereafter, when the thermostat calls for less heat the damper 26 will be moved in a closing direction to deliver proportionately less hot air and the damper 28 will be moved in an opening direction to deliver proportionately more tempered air, the total volume of air delivered being maintained constant at all times whereby to provide a stable and uniform discharge of air through the outlet grille into the room.

On the other hand, as illustrated in Fig. 9, during the peak of the cooling season the damper 26 will be entirely closed so that no tempered air is delivered from the stack 18 to the chamber 16, and the damper 28 will be wide open so that the double size stack 20 will deliver its full capacity of cold air which under these conditions comprises 100% of the volume of air delivered to the chamber 16. Thereafter, when the thermostat calls for less cold air the damper 26 will move in an opening direction to deliver tempered air and the damper 28 will move in a closing direction to deliver less cold air, the total volume of air delivered from both stacks to the mixing chamber and discharged therefrom remaining constant at all times.

From the above description it will be observed that the present air discharge outlet unit is constructed and arranged to provide a constant volume of air passing from the stacks into the mixing chamber 16 and through the discharge grille openings 24 into the room whereby to provide a stable flow of air into the room at all times during both the winter heating season and the summer cooling season. This is accomplished without changing the position of the outlet dampers relative to each other.

While the preferred embodiment of the invention has been herein illustrated and described, it will be understood that the invention may be embodied in other forms within the scope of the following claims.

Having thus described the invention, what is claimed is:

1. For use in an air conditioning and air distributing system, an outlet unit comprising a chamber having an outlet and a pair of inlets, each inlet being adapted for connection to a supply of conditioned air, means for maintaining a constant static pressure within each inlet, one inlet having twice the capacity of the other inlet and arranged to deliver at least one-half of the total volume of air delivered to the chamber at all times, and means for thermostatically controlling the volume of additional air delivered by said inlets to provide variable proportions about equal to the remaining one-half of the total volume of air supplied to the chamber whereby to provide an approximately constant total volume of air delivered to said chamber and a stable flow of air from said discharge outlet at all times.

2. In an air conditioning and distributing system of the character described, in combination, an air discharge outlet unit comprising a casing defining a mixing chamber and having a discharge outlet, a pair of air inlet stacks adapted for connection to air supply ducts and through which air of different condition is caused to flow from the supply ducts into said chamber, means for maintaining a constant static pressure within each inlet, each stack having a thermostatically controlled volume control damper, the volume control damper in one stack being arranged at right angles to the volume control damper in the second stack, said second stack having about twice the cross sectional area of the first stack, and the volume control damper in said second stack having an area equal to about one-half of the cross sectional area of its stack wherein the second stack delivers at least 50% of its capacity equal to about one-half the total volume delivered to the mixing chamber at all times, the remaining approximately one-half of the total volume being provided by modulation of the dampers to deliver less air from one stack and more air from said other stack whereby to provide a substantially constant total volume of air delivered to the mixing chamber and a stable discharge flow from the discharge outlet at all times.

3. An air discharge outlet unit as defined in claim 2 wherein the means for maintaining a constant static pressure within each inlet includes an automatic static pressure regulator cooperating with each stack for maintaining a constant static pressure and stable air flow therethrough.

4. An air discharge outlet unit as defined in claim 2 wherein the first stack is supplied with hot air and the second stack is supplied with tempered air during the the winter heating season and wherein the first stack will be wide open to deliver its full capacity of hot air equal to one-half of the total volume delivered to the mixing chamber during the peak of the winter heating season, and the second stack will deliver 50% of its capacity of tempered air equal to the remaining one-half of the total volume delivered to the mixing chamber.

5. An air discharge outlet unit as defined in claim 2 wherein the first stack is supplied with tempered air and the second stack is supplied with cold air during the summer cooling season, and wherein the first stack will be entirely closed during the peak of the summer cooling season and the second stack will be wide open to deliver its full capacity equal to 100% of the total volume delivered to the mixing chamber.

6. An air discharge outlet unit as defined in claim 2 wherein the thermostatically controlled means for operating said volume control dampers includes an air motor operatively connected to a supply of compressed air and to said dampers, and a thermostatically controlled valve between said supply and said motor.

7. An air discharge outlet unit as defined in claim 2 which includes a pressure reduction damper in each stack spaced from its thermostatically controlled volume control damper and disposed on the upstream side of each stack, and individual static pressure regulating means for each pressure reduction damper for restoring the static pressure between the dampers to a predetermined value when variations occur in such static pressure.

8. An air discharge outlet unit as defined in claim 7 wherein each of said pressure reduction dampers is of an area equal to the cross sectional area of its respective stack.

9. In an air conditioning and distributing system of the character described, in combination, an air discharge outlet unit comprising a casing defining a mixing chamber and having a discharge outlet, a pair of vertical air inlet stacks enclosed by said casing and adapted for connection to air supply ducts and through which air of different condition is caused to flow from the supply ducts into said chamber, each stack having a thermostatically controlled volume control damper at its upper end, the volume control damper in one stack being arranged at right angles to the volume control damper in the second stack, each stack also having a pressure reduction damper at its lower end and an automatic static pressure regulator cooperating with each pressure reduction damper responsive to variations in static pressure between said dampers for maintaining a substantially constant static pressure and stable air flow through the stacks, said second stack having about twice the cross sectional area of the first stack, and the volume control damper in said second stack having an area equal to about one-half of the cross sectional area of its stack wherein the second stack delivers at least 50% of its capacity equal to about one-half the total volume delivered to the mixing chamber at all times, the remaining approximately one-half of the total volume being provided by modulation of the volume control dampers to deliver less air from said first stack and more air from said second stack whereby to provide a substantially constant total volume of air delivered to the mixing chamber and a stable discharge flow from the discharge outlet at all times.

References Cited in the file of this patent

UNITED STATES PATENTS

| | | |
|---|---|---|
| 2,620,983 | Lyman | Dec. 9, 1952 |
| 2,680,566 | Gannon | June 8, 1954 |
| 2,819,023 | Marshall | Jan. 7, 1958 |
| 2,844,322 | Kautz | July 22, 1958 |
| 2,856,131 | Conlan | Oct. 14, 1958 |

FOREIGN PATENTS

| | | |
|---|---|---|
| 253,317 | Great Britain | June 17, 1926 |

OTHER REFERENCES

Sarco: Catalog Sheet "Sarco No. 140, June 1936," A.I.A. file 29–D 21, two pages.